(12) United States Patent
Bang et al.

(10) Patent No.: US 11,658,314 B2
(45) Date of Patent: May 23, 2023

(54) METHOD AND SYSTEM FOR PREVENTING INJURY FROM HOT EXHAUST GAS

(71) Applicant: BLUE WORLD TECHNOLOGIES HOLDING APS, Aalborg Ost (DK)

(72) Inventors: Mads Bang, Stovring (DK); Deni Maric, Aalborg (DK); Peter Leander Jensen, Svenstrup (DK); Fan Zhou, Klarup (DK)

(73) Assignee: BLUE WORLD TECHNOLOGIES HOLDING APS, Aalborg Øst (DK)

( * ) Notice: Subject to any disclaimer, the term of this patent is extended or adjusted under 35 U.S.C. 154(b) by 0 days.

(21) Appl. No.: 17/793,546

(22) PCT Filed: Jan. 12, 2021

(86) PCT No.: PCT/DK2021/050010
§ 371 (c)(1),
(2) Date: Jul. 18, 2022

(87) PCT Pub. No.: WO2021/148092
PCT Pub. Date: Jul. 29, 2021

(65) Prior Publication Data
US 2023/0040546 A1  Feb. 9, 2023

(30) Foreign Application Priority Data
Jan. 20, 2020 (DK) .......................... PA 2020 00064

(51) Int. Cl.
*H01M 8/04007* (2016.01)
*H01M 8/04119* (2016.01)
*B01D 5/00* (2006.01)
*F01N 3/022* (2006.01)

(52) U.S. Cl.
CPC ...... *H01M 8/04007* (2013.01); *B01D 5/0027* (2013.01); *F01N 3/022* (2013.01); *H01M 8/04164* (2013.01); *B01D 2258/0208* (2013.01); *H01M 2250/20* (2013.01)

(58) Field of Classification Search
CPC ......... H01M 8/04007; H01M 8/04164; H01M 2250/20; B01D 5/0027; B01D 2258/0208; F01N 3/022
See application file for complete search history.

(56) References Cited

U.S. PATENT DOCUMENTS

| | | | |
|---|---|---|---|
| 5,310,548 A | * | 5/1994 | Tsuru ................. B01J 20/048 424/602 |
| 2006/0037298 A1 | * | 2/2006 | Greenwood ........... B01D 39/12 55/525 |
| 2006/0134471 A1 | | 6/2006 | Gerard |
| 2007/0116621 A1 | * | 5/2007 | De Vaal ............ H01M 8/04231 429/408 |
| 2009/0232714 A1 | * | 9/2009 | Abe ..................... B01D 39/12 422/180 |
| 2012/0086385 A1 | * | 4/2012 | Masouras ........... H01M 8/0618 429/465 |
| 2018/0241060 A1 | | 8/2018 | Harbusch et al. |
| 2018/0294491 A1 | * | 10/2018 | Ito ..................... H01M 8/04291 |

FOREIGN PATENT DOCUMENTS

| | | |
|---|---|---|
| CN | 210576249 U | 5/2020 |
| CN | 210607475 U | 5/2020 |
| DE | 10129098 A1 | 1/2003 |
| DE | 10346692 A1 | 6/2005 |
| DE | 102009051476 A1 | 5/2011 |
| DE | 102012023682 A1 | 6/2014 |
| DE | 102014003310 A1 | 9/2015 |
| JP | H066159 U | 1/1994 |

OTHER PUBLICATIONS

International Search Report for PCT/DK2021/050010, Prepared by the Nordic Patent Institute, dated Apr. 8, 2021, 4 pages.

* cited by examiner

*Primary Examiner* — Muhammad S Siddiquee
(74) *Attorney, Agent, or Firm* — Brooks Kushman P.C.; John E. Nemazi

(57) ABSTRACT

In order to prevent injury from hot exhaust gas, water is condensed by a metal net in the exhaust pipe.

10 Claims, 1 Drawing Sheet

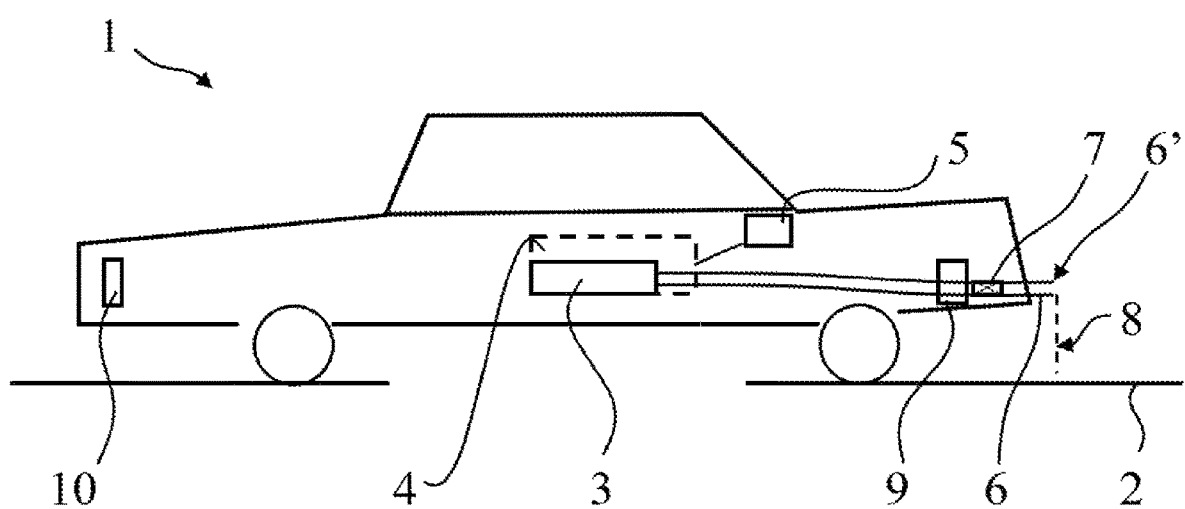

METHOD AND SYSTEM FOR PREVENTING INJURY FROM HOT EXHAUST GAS

CROSS-REFERENCE TO RELATED APPLICATION

This application is the U.S. national phase of PCT Application No. PCT/DK2021/050010 filed on Jan. 12, 2021, which claims priority to DK Patent Application No. PA 2020 00064 filed on Jan. 20, 2020, the disclosures of which are incorporated in their entirety by reference herein.

FIELD OF THE INVENTION

The invention relates to fuel cell systems in vehicles, and in particular to a method and system for prevention of injury from hot exhaust gas that contains water vapour.

BACKGROUND OF THE INVENTION

In fuel cells, electricity is provided by hydrogen ions H+ traversing a polymer membrane from the anode side to the cathode side of the fuel cell. Oxygen gas is provided to the cathode side of the fuel cell, for example by air taken from the environment and compressed for being used in the fuel cell system. The oxygen gas reacts with the hydrogen ions to produce water. The water steam leaves the fuel cell as part of the exhaust gas.

In German patent documents DE10346692 and DE10129098, compact cyclone demisters with internal wire meshes are used to recycle the water for the fuel cell system. A different type of demister is disclosed in DE102012023682, in which a bent tube with a wire mesh is used for extracting droplets from the exhaust gas, which is necessary for preventing a downstream turbine from damage. Characteristic for these demisters is an efficient separation of water from the exhaust gas. Although, the systems are compact to a certain degree, the result is a relatively complicated system and, in particular, a drain has to be provided in addition to an exhaust pipe. Such extra features are justified by the purpose of driving a turbine, as in DE102012023682, or by the purpose of recovering all the water from the exhaust gas. However, for those systems, where this is not a necessity, such features appear to make the system unnecessarily complex.

US2018/0294491 discloses water recovery for the fuel cell, and release of part of the water through the exhaust gas pipe. US2018/241060 discloses water recovery and an evaporation/condensation device where energy for evaporation is provided by waste heat from exhaust gas. DE102014003310 discloses an exhaust system with a water collector, from which water is released along with the exhaust gas through a venturi. DE102009051476 discloses a fuel cell system in which water is atomized into the exhaust gas.

US2007/116621 discloses a fuel cell equipped with an exhaust flow path and an exhaust system comprising a wire mesh for causing turbulence so that the oxidant transported in the exhaust pipe mixes with the hydrogen therein.

Especially for automobiles, it is important to provide compact and light-weight technical solutions, avoiding features that are not strictly necessary. There is a steady demand for improvements.

DESCRIPTION OF THE INVENTION

It is an objective to provide an improvement in the art. It is a further objective to provide improved safety measures for vehicles that comprise fuel cell systems with high temperature fuel cells. These and more objectives are achieved with a system and method as described in the claims and in more detail in the following.

Taking offset in the above mentioned prior art, a fuel cell system in which water is not necessarily recovered, and where no turbines are driven by the exhaust gas, as in the exemplified systems described below, cyclone demisters of bent tubes with wire meshes appear unnecessary. It would therefore be obvious to avoid such means. However, when having regard to a special class of fuel cells, there are other considerations that apply. This is explained in greater detail below.

Some fuel cell systems operate at high temperatures above 120° C. For such high temperature fuel cells, the water is released as hot vapor. In the case of an automobile, the release of hot vapor from the exhaust pipe implies a risk for injury to persons near the exhaust outlet, as the vapor has a relatively high thermal energy. Specifically, for such high temperature systems, it would be desirable if such risk for injury is prevented or at least efficiently minimized. It is therefore in particular an objective to provide improved safety measures for fuel cell systems from which water vapor is released at temperatures that can cause injury to skin.

For resolving this issue, attention is drawn to the above discussed wire mesh demisters. Although, the exhaust gas is not used for driving a turbine and not necessarily used for recovery of water, it has turned out that wire mesh demisters are useful for preventing injury from the hot gas that is released from the exhaust pipe of the car. The demisters are used to demist the exhaust gas so that the hot exhaust gas that flows out of the exhaust pipe itself is dry. However, the water drops that are created with the wire mesh are also released through the same exhaust pipe and flow together with the exhaust gas to the end of the exhaust pipe of the vehicle. However, due to the fact that the water is in the state of drops downstream of the wire mesh, the drops merely drip out of the end of the exhaust pipe while the hot dry gas is leaving the exhaust without causing injury. The dripping out of how water drops from the exhaust pipe reduces danger for injury to the human behind the exhaust pipe.

The invention works equally well if such extra drain exists or is established. However, in contrast to the prior art, there is no necessity for such extra drain, as the end of the exhaust pipe itself can function as a drain. This makes the system simple, compact, and light-weight, and the system can be established at low cost. No cyclone has to be added and no bent tubes with additional drain.

Accordingly, in some embodiments, when compared to the prior art, the present invention is different in that the dried exhaust gas and the water drops flow together through the exhaust pipe and are released at the end of the same exhaust pipe.

As mentioned, the method is particularly useful for high temperature fuel cells. The term "high temperature" is a commonly used and understood term in the technical field of fuel cells and refers to operation temperatures above 120° C. in contrast to low temperature fuel cells operating at lower temperatures, for example at 70° C. For example, the fuel cell operates in the temperature range of 120-200° C.

For example, the fuel cell in the fuel cell system is a high temperature polymer electrolyte membrane fuel cell, (HT-PEM), which operates above 120° C., differentiating HT-PEM fuel cell from low temperature PEM fuel cells, the latter operating at temperatures below 100° C., for example at 70° C. The normal operating temperature of HT-PEM fuel cells is the range of 120° C. to 200° C., for example in the range of 160 to 185° C. The polymer electrolyte membrane PEM in the HT-PEM fuel cell is mineral acid based, typically a polymer film, for example polybenzimidazole doped with phosphoric acid. HT-PEM fuel cells are advantageous in being tolerant to relatively high CO concentration and are therefore not requiring PrOx reactors between the reformer and the fuel cell stack, why simple, lightweight and inexpensive reformers can be used, which minimizes the overall size and weight of the system in line with the purpose of providing compact fuel cell systems, especially for automobile industry.

In some practical embodiments, alcohol is used as part of the fuel for the fuel cell, for example a mix of methanol and water. In a heated reformer, the fuel is catalytically reacted into syngas for the fuel cell for providing the necessary hydrogen gas to the anode side of the fuel cell. For the catalytic reaction in the reformer, the provided liquid fuel is evaporated in an evaporator that is conduit-connected to the reformer. For heating the reformer to the proper catalytic conversion temperature, for example in the range of 220-280° C., a reformer burner is provided and in thermal contact with the reformer for transfer of heat to the catalyser inside the reformer. The reformer burner comprises a burner-chamber providing flue gas by burning anode waste gas or fuel or both. For example, the reformer burner provides flue gas at a temperature in the range of 320-600° C., is provided from a reformer burner. The reformer comprises a catalyzer inside a reformer housing, which has reformer walls. For example, the flue gas from the reformer burner is passing along the reformer walls and heats them. In such embodiment, the burner-chamber is in fluid-flow communication with the reformer walls for flow of the flue gas from the burner-chamber to and along the reformer walls for transfer of heat from the flue gas to the reformer walls.

As source for oxygen gas in the fuel cell, air is typically used and provided to the cathode side. Optionally, prior to entering the fuel cell, the air is heated by an air preheating system for increasing the temperature of the air. Other gases that are part of the air merely flow through the system largely as inert gases and are discarded again through an exhaust system.

In the above example of a HT-PEM fuel cell system, operating at 170-185° C., the water vapor that is released is too hot for being released at that temperature from the exhaust, in particular the exhaust pipe of a vehicle, such as automobile. As a safety measure, advantageously, the water vapor is demisted by the wire mesh.

As an additional safety measure, a heat exchanger is potentially provided as a cooler, by which the water vapor is cooled and the water more efficiently demisted by the wire mesh prior to release through the exhaust pipe. Advantageously, the water vapor is cooled below its dew point, which increases the efficiency of the drop formation by the wire mesh. With such additional measures, the water merely drips out of the exhaust pipe of the vehicle without any risk for humans standing near to the end of the exhaust pipe.

It has been found surprisingly that a metal mesh filter disposed in the exhaust pipe downstream of the cooling heat exchanger drastically promotes condensation of the water vapor into liquid water even when no cyclone or otherwise bent tubes are used. Particular efficiency has been found when reducing the temperature of the water vapor to below the dew point by pressure variation, which is discussed in more detail herein.

Due to the efficient condensation of water vapor into drops, it is also possible to recycle a portion of the water into the fuel cell system, where the water is mixed with alcohol for providing new fuel to the reformer in order to catalytically produce syngas therefrom for the fuel cell. However, due to the fact that the drops are released through the exhaust pipe, there is a large degree of freedom for a decision as to how much of the water in the fuel cell system should be recycled and how much should be released through the exhaust pipe of the vehicle. This is a greater degree of freedom as in the prior art where all water has to be recycled or released through a drain, for example because the downstream turbine does not tolerate water droplets.

The metal mesh filter is advantageously a compressed metal mesh filter, for example knitted or woven, optionally made as a roll of metal wire sheets. For example, the length of the wire mesh is between 10 mm and 10 cm in the direction of the exhaust flow path. Typically, the wire mesh fills the cross section of the exhaust flow path in order to prevent the water vapor to bypass the wire mesh.

Advantageously, as a simple measure, the wire mesh is provided in exhaust pipe, where the exhaust pipe defines the flow path of the exhaust gas. Providing the wire mesh after a potential condenser with a condensing step and/or potentially close to the end of the exhaust pipe has the advantage that the vapor has attained a reduced temperature, which increases the ability of the wire mesh to promote condensation of the vapor into droplets and merging of small droplets into water drops that run at the bottom of the exhaust pipe and drip out of the exhaust pipe at its end.

The function of the mesh a collection and/or separation of the condensate.

Typical sizes of the water drops formed by the wire mesh are in the range of 40-900 micrometers if formed on a surface, for example on the mesh surface. However, a direct condensation of saturated vapor into droplets can lead to droplets of much smaller size, for example in the range of 0.1-50 micrometers.

By increasing the pressure of the exhaust, the dew point of water increases, which implies that condensation can take place at higher temperature. For example, the dew point of water increases approximately from 40° C. to 48° C. by raising the pressure with half a bar (50 kPa). This can be utilized advantageously for increasing the condensation effect by the metal wire mesh.

DESCRIPTION OF THE DRAWING

Embodiments of the invention will be described in the FIGURES, wherein:

FIG. 1 a vehicle with a fuel cell system and an exhaust pipe comprising a wire mesh filter in the flow path of the water vapour.

DETAILED DESCRIPTION OF THE INVENTION

FIG. 1 illustrates vehicle 1 on ground 2 and containing a fuel cell 3 typically multiple fuel cells, for example as a stack of fuel cells, as part of a fuel cell system 4.

Advantageously, the fuel cell 3 is a high temperature polymer electrolyte membrane (HT-PEM) fuel cell. Typically, high temperature fuel cells operate in the temperature range of 120-200° C., and thus are producing heat as well. For example, the fuel cell 3 operates at a temperature of 170-185° C. This operation temperature is held constant by a correspondingly adjusted flow of first coolant in a cooling circuit through the fuel cell. For example, the temperature of the first coolant at the coolant inlet of the fuel cell is in the range of 160° C. to 170° C.

Apart from the fuel cells 3, the fuel cell system 4 comprises a combination of a reformer and corresponding reformer burner, and a temperature regulation system, including a cooling circuit. In addition, a power management system is provided. Fuel is provided from a fuel tank 5. For example, the fuel tank 5 contains alcohol, optionally methanol, to which water is added prior to catalytic transformation in a reformer for providing it as hydrogen fuel to the fuel cell.

As an example, in the reformer, the mix of methanol $CH_3OH$ and water $H_2O$ is catalytically converted into hydrogen gas $H_2$. Simplified, the reactions in the process of methanol steam reaction include decomposition of methanol into carbon monoxide and hydrogen ($CH_3OH \rightarrow 2H_2 + CO$), followed by the water-gas shift reaction ($CO + H_2O \rightarrow CO_2 + H_2$). The mix of $H_2$ and $CO_2$ is then supplied as so-called syngas to the anode side of the fuel cell 3, typically fuel cell stack.

Air from the environment is sucked in and supplied at increased pressure, typically by using a compressor, to the cathode side of the fuel cell 3 in order to provide the necessary oxygen for the reaction with the hydrogen to produce water, after hydrogen ions H+ have passed the membrane from the anode side to the cathode side.

The exhaust gases from the fuel cell 3 leave the system through the exhaust 6 of the vehicle 1, for example as illustrated at the very rear of the vehicle 1. Together with the N2 and some of the O2 from the air, which has passed through the cathode side of the fuel cell system 4, the produced water vapor is released through the exhaust system. Optionally, the exhaust gas from the fuel cell is mixed with gas from the reformer. For example, the mix is then inserted into a condenser for condensation of the vapor As for high temperature fuel cells, the vapor has a temperature far above 100° C., optionally even up to 220° C., the vapor contains a large portion of thermal energy, which potentially causes a risk for a human standing close behind the exhaust pipe 6 end at the rear of the vehicle 1.

In order to collect drops of water, a wire mesh 7 is provided in the flow path for the exhaust gas from the fuel cell 3, advantageously after a condenser. The wire mesh assists in the separation of water and provides drops 8 that drip out of the exhaust pipe 6 of the vehicle 1.

Potentially, a heat exchanger 9 is provided as an air cooler, by which the water vapor is cooled and the water more efficiently demisted by the wire mesh 7 prior to release through the outlet 6' of the exhaust pipe 6. Advantageously, the water vapor is cooled below its dew point, which increases the efficiency of the drop formation by the wire mesh 7.

The heat exchanger 9 is optionally flow connected with a radiator cooler heat exchanger 10, for example at the front of the vehicle, which is a common location for such general cooler heat exchanger 10.

REFERENCE NUMBERS

1 vehicle
2 ground
3 fuel cell
4 fuel cell system
5 tank
6 exhaust pipe of vehicle
6' outlet of exhaust pipe
7 wire mesh
8 drops dripping out of exhaust 6
9 cooler
10 radiator heat exchange cooler of vehicle

The invention claimed is:

1. A method of preventing injury from hot exhaust gas released from an exhaust system through an outlet of an exhaust pipe of a vehicle, the vehicle comprising a high temperature fuel cell system that is operating at temperatures in the range of 120-200° C. when producing electrical power, wherein the method comprises:
   providing a wire mesh in the flow path of the exhaust gas through the exhaust system from the fuel cell to the exhaust pipe outlet,
   wherein the exhaust gas contains water vapor, and wherein the method comprises condensing water drops with the wire mesh for creating dried exhaust gas, and releasing the drops through the exhaust pipe and out of the exhaust pipe outlet together with the dried exhaust gas,
   wherein the wire mesh is provided inside the exhaust pipe of the vehicle, the exhaust pipe defining the flow path of the exhaust gas to the exhaust pipe outlet, wherein the wire mesh extends entirely across the exhaust flow path in order to prevent the water vapor to bypass the wire mesh;
   wherein the method further comprises:
   providing a heat exchanger for cooling the water vapor in the exhaust gas in the flow path to the exhaust pipe outlet and wherein the method comprises cooling the vapor to below its dew point upstream of the wire mesh in order to cause increased drop formation in the wire mesh; and/or
   raising the dew point of the water vapor by raising the pressure of the water vapor in the exhaust system for increased condensation.

2. The method according to claim 1, wherein the fuel cell is a high temperature polymer electrolyte membrane HT-PEM fuel cell.

3. The method according to claim 1, further comprising providing the wire mesh as a compressed metal mesh filter that is knitted or woven or made as a roll of metal wire sheets.

4. The method according to claim 1, further comprising providing the wire mesh with a length of between 10 mm and 10 cm when measured in the direction of the exhaust flow path.

5. A system for preventing injury from hot exhaust gas released from an exhaust system through an outlet of an exhaust pipe of a vehicle, the vehicle comprising a HT-PEM fuel cell system configured for operation at temperatures in the range of 120-200° C. when producing electrical power, wherein the system comprises a wire mesh in the flow path of the exhaust gas through the exhaust system from the fuel cell to the exhaust pipe outlet and the system is configured for condensing water drops by the wire mesh for creating dried exhaust gas and for releasing the drops through the exhaust pipe and out of out of the exhaust pipe outlet together with the dried exhaust gas, wherein the wire mesh is provided inside the exhaust pipe of the vehicle, the exhaust pipe defining the flow path of the exhaust gas to the exhaust pipe outlet, wherein the wire mesh extends entirely across the exhaust flow path in order to prevent the water vapor to bypass the wire mesh;
   wherein the system comprises A or B or a combination of A and B, wherein in A, a heat exchanger is provided which is configured for cooling the exhaust gas with the water vapor in the flow path to the exhaust pipe outlet to below its dew point upstream of the wire mesh in order to cause increased drop formation in the wire mesh; and wherein in B, the system comprises means for raising the dew point of the water vapor by raising the pressure of the water vapor in the exhaust system for increased condensation.

6. The system according to claim 5, wherein the wire mesh is a compressed metal mesh filter that is knitted or woven or made as a roll of metal wire sheets and with a length of between 10 mm and 10 cm when measured in the direction of the exhaust flow path.

7. The system according to claim 5, further compressing an exhaust gas heat exchanger in the exhaust pipe upstream of the wire mesh.

8. The system according to claim 6 wherein the gas heat exchanger is connected to a radiator of the vehicle.

9. The method according to claim 1, further comprising providing an exhaust gas heat exchanger in the exhaust pipe upstream of the wire mesh.

10. The method according to claim 9, wherein the exhaust gas heat exchanger is cooled by a radiator of the vehicle.

* * * * *